US012442409B2

(12) United States Patent
Richter et al.

(10) Patent No.: US 12,442,409 B2
(45) Date of Patent: Oct. 14, 2025

(54) CLOSURE ELEMENT FOR A BALL JOINT, BALL JOINT FOR A CHASSIS OF A VEHICLE AND METHOD FOR PRODUCING SUCH A CLOSURE ELEMENT AND/OR SUCH A BALL JOINT (71) Applicant: ZF Friedrichshafen AG, Friedrichshafen (DE)

(72) Inventors: Thomas Richter, Damme (DE); Hans Prins, Damme (DE); Christoph Gierke, Espelkamp (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 334 days.

(21) Appl. No.: 18/006,713

(22) PCT Filed: Jun. 23, 2021

(86) PCT No.: PCT/EP2021/067093
§ 371 (c)(1),
(2) Date: Jan. 24, 2023

(87) PCT Pub. No.: WO2022/022895
PCT Pub. Date: Feb. 3, 2022

(65) Prior Publication Data
US 2023/0250847 A1 Aug. 10, 2023

(30) Foreign Application Priority Data
Jul. 28, 2020 (DE) .................... 10 2020 209 477.2

(51) Int. Cl.
*F16C 11/06* (2006.01)
(52) U.S. Cl.
CPC ........ *F16C 11/069* (2013.01); *F16C 11/0638* (2013.01); *Y10T 403/32737* (2015.01)

(58) Field of Classification Search
CPC .............. F16C 11/0623; F16C 11/0628; F16C 11/0633; F16C 11/0638; F16C 11/0685; F16C 11/069; Y10T 403/32737
See application file for complete search history.

(56) References Cited

U.S. PATENT DOCUMENTS 4,093,312 A  6/1978 Kretschmer
4,230,415 A  10/1980 Scheerer
(Continued)

FOREIGN PATENT DOCUMENTS

DE   101 10 738 C1   11/2002
DE   103 47 815 A1   5/2005
(Continued)

OTHER PUBLICATIONS

European Patent Office, International Search Report issued for International patent application No. PCT/EP2021/067093 (Sep. 24, 2021).
(Continued)

*Primary Examiner* — Amber R Anderson
*Assistant Examiner* — Kevin J Baynes
(74) *Attorney, Agent, or Firm* — Finch & Maloney PLLC (57) ABSTRACT The invention relates to a closure element (2, 27, 30, 35) for a ball joint (1, 26, 29, 34) with a first component (12) made of metal and with a second component (13) made of a plastic material, where the second component (13) is designed as a first bearing component (10, 38, 46) of a two-part slide bearing (9) for the ball joint (1, 26, 29, 34). To enable high functionality and as economical a production cost as possible, the closure element (2, 27, 30, 35) is characterized in that the first component (12) has a cylindrical inner circumferential surface (18) and a cylindrical outer circumferential surface (19) of the second component (13) is arranged on the
(Continued)

said inner circumferential surface (18) in an interlocked, frictionally fixed and/or material-bonded manner.

13 Claims, 11 Drawing Sheets

(56) References Cited

U.S. PATENT DOCUMENTS

| | | | | |
|---|---|---|---|---|
| 4,231,673 | A | * | 11/1980 | Satoh ................. F16C 11/0633 403/135 |
| 4,577,989 | A | * | 3/1986 | Ito ....................... F16C 11/0638 403/135 |
| 4,797,019 | A | * | 1/1989 | Wood, Jr. ............ F16C 11/0633 403/135 |
| 5,395,176 | A | | 3/1995 | Zivkovic |
| 5,609,433 | A | * | 3/1997 | Pazdirek ............... F16C 11/069 403/135 |
| 5,782,574 | A | | 7/1998 | Henkel |
| 6,042,293 | A | | 3/2000 | Maughan |
| 6,164,861 | A | * | 12/2000 | Maughan ........... F16C 11/0638 403/135 |
| 6,485,218 | B1 | * | 11/2002 | Martinovsky ........... B60T 13/52 403/135 |
| 6,773,196 | B2 | | 8/2004 | Broker et al. |
| 6,902,345 | B2 | | 6/2005 | Kur |
| 7,040,833 | B2 | | 5/2006 | Kondoh |
| 7,153,055 | B1 | | 12/2006 | Dorr |
| 7,306,393 | B2 | * | 12/2007 | Erdogan ............... F16F 1/3842 403/135 |
| 7,322,769 | B2 | * | 1/2008 | Heuser ................. F16C 33/201 403/135 |
| 7,357,591 | B2 | | 4/2008 | Broker et al. |
| 7,367,742 | B2 | | 5/2008 | Brunneke et al. |
| 7,661,902 | B2 | | 2/2010 | Brunneke |
| 8,137,021 | B2 | | 3/2012 | Bohne et al. |
| 8,152,186 | B2 | * | 4/2012 | Jeong .................... B60G 7/005 280/124.134 |
| 8,251,605 | B2 | | 8/2012 | Brunneke |
| 8,281,490 | B2 | | 10/2012 | Nishide et al. |
| 8,678,656 | B2 | * | 3/2014 | Richter ................. F16C 11/068 403/135 |
| 8,714,571 | B2 | | 5/2014 | Nataraj et al. |
| 8,851,785 | B1 | | 10/2014 | Belleau et al. |
| 9,056,538 | B2 | * | 6/2015 | Kuroda .................... F16C 11/06 |
| 9,482,268 | B2 | * | 11/2016 | Nachbar ............. F16C 11/0614 |
| 9,719,554 | B2 | | 8/2017 | Nishide et al. |
| 10,066,661 | B2 | | 9/2018 | Kim |
| 10,247,228 | B2 | | 4/2019 | Yu et al. |
| 10,557,496 | B2 | * | 2/2020 | Lonergan, III ..... F16C 11/0628 |
| 11,078,952 | B2 | | 8/2021 | Sieve et al. |
| 11,585,372 | B2 | * | 2/2023 | Kuroda ............. F16C 11/0633 |
| 2009/0080967 | A1 | * | 3/2009 | Gercke ................... F16C 33/28 403/135 |
| 2009/0279820 | A1 | | 11/2009 | Nishide et al. |
| 2012/0141192 | A1 | | 6/2012 | Kwon |
| 2016/0160907 | A1 | | 6/2016 | Kim |
| 2018/0163775 | A1 | | 6/2018 | Gräber et al. |
| 2020/0032840 | A1 | * | 1/2020 | Sieve ................. F16C 11/0685 |
| 2021/0270314 | A1 | * | 9/2021 | Auquier ................. F16C 11/12 |

FOREIGN PATENT DOCUMENTS

| | | | |
|---|---|---|---|
| DE | 10 2006 026 304 A1 | 12/2007 | |
| DE | 10 2007 012 891 A1 | 4/2008 | |
| DE | 10 2007 008 748 A1 | 1/2009 | |
| DE | 10 2018 215 172 A1 | 3/2020 | |
| GB | 932103 | 7/1963 | |
| KR | 1020100109708 A | * 10/2010 | .............. F16C 11/06 |
| WO | 2005003575 A1 | 1/2005 | |
| WO | 2013/143582 A1 | 10/2013 | |

OTHER PUBLICATIONS

European Patent Office, Written Opinion issued for International patent application No. PCT/EP2021/067093 (Sep. 24, 2021).

German Patent Office, Office Action issued in German patent application No. 10 2020 209 477.2 (Jun. 7, 2021).

* cited by examiner

CLOSURE ELEMENT FOR A BALL JOINT, BALL JOINT FOR A CHASSIS OF A VEHICLE AND METHOD FOR PRODUCING SUCH A CLOSURE ELEMENT AND/OR SUCH A BALL JOINT

RELATED APPLICATIONS

This application claims the benefit under 35 U.S.C. § 371 as a U.S. National Phase Application of application no. PCT/EP2021/067093, filed on 23 Jun. 2021, which claims priority to German Patent Application no. 10 2020 209 477.2 filed 28 Jul. 2020, the contents of which are hereby incorporated herein by reference in their entireties.

FIELD OF THE DISCLOSURE

The invention relates to a closure element for a ball joint comprising a first component made of metal and a second component made of a plastic material, wherein the second component is in the form of a first bearing component of a two-part slide bearing for the ball joint. Furthermore, the invention relates to a ball joint for a chassis of a vehicle, comprising a joint housing and an inner joint portion which is fitted and able to move in a housing cavity of the joint housing, wherein a two-part slide bearing is arranged between an inside of the housing cavity and the said inner joint portion. In addition, the invention relates to a method for producing such a closure element and/or such a ball joint.

BACKGROUND

A closure element and a ball joint of the type mentioned at the outset are known from DE 10 2018 215 172 A1. According to this disclosure, for example, a metallic insert component has the material of a plastic component injection-molded at least partially around it. Various concrete embodiments are shown, which incur various degrees of manufacturing complexity and cost.

Depending on the design, this complexity can lead to undesirably high production costs. In particular, it is challenging on the one hand to ensure a high pull-out force and/or dynamic strength of the ball joint, and at the same time to ensure a low breakaway torque.

SUMMARY

The purpose of the present invention is to develop further a closure element, a ball joint and/or a method of the type mentioned above in such manner that high functionality and the lowest possible production costs are achieved. In particular, an alternative embodiment should be provided.

The problem upon which the invention is based is solved by a closure element and/or a method according to the present disclosure.

Preferred further developments of the invention emerge from the claims and from the description that follows.

According to the present disclosure a closure element for a ball joint is proposed. In particular, the closure element is designed to secure an inner joint portion in a joint cavity of a joint housing. Preferably, the closure element prevents the inner joint portion from falling and/or being pulled out of the joint housing, up to a specified pull-out force. The closure element can be in the form of a closing cover. Preferably, the closure element is in the form of a closure ring. Through such a closure ring a ball stud of the inner joint portion can extend out of the joint housing or out of the joint cavity. The closure element comprises a first component made of metal and a second component made of a plastic material. In particular, the closure element consists exclusively of the first component and the second component. Owing to the different materials of the two components the closure element is produced as a hybrid component. Its second component can be made of a plastic material alone or of a fiber-reinforced plastic material. Furthermore, the second component is in the form of a first bearing component of a two-part slide bearing for the ball joint. A slide bearing can reduce the friction and hence the wear of the ball joint despite the high operational loads to which it sometimes is subjected. The first component has a cylindrical inner circumferential surface. A cylindrical outer circumferential surface of the second component is arranged on the inner circumferential surface in an interlocked, frictionally fixed, and/or materially bonded manner.

In this case it is advantageous that a comparatively simple geometric contour is produced, which can, on the one hand, be made economically, and on the other hand, enables the functional properties of a ball joint with such a closure element to be adjusted to sufficient levels.

Preferably, the inner circumferential surface of the first component is formed by a hollow-cylindrical web section of the first component. In particular, the hollow-cylindrical web section is ring-shaped or sleeve-like. The second component can be pressed into the first component. Preferably the second component is injection-molded and/or cast onto the first component. In particular, the cylindrical outer circumferential surface of the second component has a shape that corresponds to that of the cylindrical inner circumferential surface of the said web section. The outer circumferential surface of the second component is directly in contact with the inner circumferential surface of the first component. Preferably, a solid bond is formed between the inner circumferential surface of the first component and the outer circumferential surface of the second component.

In a further embodiment at least or exactly one ring section of the first component extends radially inward, starting from the web section and in particular at a right-angle to a central longitudinal axis of the closure element. Preferably, the first component is made integrally in one piece. The ring section can be formed by deformation. Preferably, by virtue of the ring section and the web section the first component has an L-shaped cross-section. The second component can be arranged in an interlocking, frictionally fixed, and/or material-bonded manner on a surface of the ring section that faces toward the web section. In particular, the surface of the ring section facing toward the web section is orientated transversely or perpendicularly to the web section and is directed radially inward.

According to a further development, the ring section is covered by the second component. In particular, the ring section is partially or completely embedded in the second component. In other words, the ring section can be coated by the plastic material of the second component.

Preferably, a front end of the first component facing away from the ring section is partially or completely covered by the second component and/or embedded in the plastic material of the second component. In particular, the said front end extends perpendicularly or radially to an axial extension of the central longitudinal axis of the closure element. Preferably, the front end and the ring section are arranged or formed at two ends and/or edges of the first component that are remote from one another.

According to a further development, the first component comprises a web-like flange section. The web-like flange section extends coaxially relative to the central longitudinal axis of the closure element, starting from the ring section in a direction away from the web section and/or from the second component. In particular, the web-like flange section can be in the form of a prolongation of the web section in the axial direction relative to the central longitudinal axis. By virtue of the structure consisting of the web section, the ring section and the web-like flange section, the first component can have a T-shaped or a simply stepped cross-section. In particular, the first component consisting of the web section, the ring section and the web-like flange section is made integrally in one piece.

Preferably, an outer circumference of the first component faces away from the second component. The outer circumference of the first component can be ring-shaped, annular, and/or cylindrical. At least the outer circumference of the first component is not covered by the plastic material of the second component. In that way the outer circumference of the first component can make contact directly with an inner side of a housing cavity of a joint housing.

In particular, the outer circumference has at least one projection or more than one projection. The at least one projection can be in the form of a claw tab. The projection co-operates by interlocking with a recess in the inner side of the housing cavity shaped to correspond to the projection, for the interlocked attachment of the closure element. Alternatively, or in addition, when the closure element is inserted into the housing cavity the projection can be at least partially plastically deformed.

Particularly advantageous is a ball joint for a chassis of a vehicle, especially a motor vehicle, having a joint housing and an inner joint portion fitted movably in a housing cavity of the joint housing, wherein a two-part slide bearing is arranged between an inside of the housing cavity and the said inner joint portion, and also having a closure element according to the invention.

The ball joint can be part of a chassis, in particular a chassis component. In automotive engineering ball joints have many uses. In particular, in-chassis ball joints serve to articulate chassis components such as control arms, wheel carriers, track rods, or the like to one another or to the vehicle body or an axle support attached thereto.

In particular, the joint housing is in the form of a joint housing open on one side. The inner joint portion can be fitted into the housing cavity or the slide bearing so that it can pivot relative to the joint housing. The inner joint portion can be in the form of a ball sleeve. Preferably, the inner joint portion is made as a ball stud. A section of the stud can extend out of the joint housing or the joint housing cavity and through the closure element made as a closure ring.

Preferably the ball joint has a central longitudinal axis about which the ball joint and/or the inner joint portion can move. In particular, the central longitudinal axis extends in the axial direction of the inner joint portion. The central longitudinal axis of the ball joint and the central longitudinal axis of the closure element can coincide. In particular, the ball joint, the joint cavity, the inner joint portion, and/or the closure element are made rotationally symmetrical or substantially rotationally symmetrical relative to the central longitudinal axis. The inner joint portion can comprise a joint ball. In particular, the joint ball is fitted and able to move in the slide bearing. The central longitudinal axis can pass through a mid-point of the joint ball.

According to a further development, the closure element with the second component is made as the first bearing component of the slide bearing and a second bearing component of the slide bearing is arranged and/or made rotationally symmetrically relative to the central longitudinal axis of the ball joint. In particular, the first bearing component or the closure element is pressed onto the second bearing component in the direction of the central longitudinal axis. The second bearing component of the slide bearing can be cup-shaped or pot-shaped.

Preferably, an outer circumference of the first component of the closure element is in contact with the inside of the housing cavity. The closure element can be pressed into the housing cavity. In particular, an edge of the joint housing is deformed in order to fix the closure element in place. Preferably, a front end of the closure element and/or a front end of the first component is in contact with an edge of the second bearing component in the axial direction relative to the central longitudinal axis. In that way the second bearing component is fixed in the housing cavity and/or is prevented from rotating.

The second bearing component can have corrugations on its outside. The corrugations can extend in the axial direction relative to the central longitudinal axis of the ball joint and/or the closure element. In particular, the corrugations allow tolerance compensation. Preferably, by means of the corrugations and after tempering, an undesired compression and/or sticking of the inner joint portion in the slide bearing is resolved and/or compensated. Preferably, a supporting surface at the end of the second bearing component is formed as a fixed abutment relative to the middle or in the direction of the central longitudinal axis. In particular, the corrugations on the outside of the second bearing component serve for tolerance compensation and/or as a compensating element for axial stresses.

The ball joint can be prestressed in the joint housing by means of the closure element, in that the closure element is pressed into the housing cavity of the joint housing with a predetermined force.

The first bearing component and the second bearing component can have interlocking elements designed to correspond with one another, which engage in one another with interlock during the production of the slide bearing. For example, such an interlock can be produced by means of tooth arrays that engage in one another. In particular, the first bearing component and the second bearing component each have an annular tooth array or a ring of teeth.

The closure element, in particular together with a deformed edge of the joint housing, can have a recess for a rim of a sealing bellows.

Particularly advantageous is a method for producing a closure element according to the invention and/or a ball joint according to the invention, wherein the second component is arranged, pressed or injection-molded onto the first component.

Preferably, a second bearing component is first inserted into the housing cavity of the joint housing. Then, an inner joint portion is arranged in the second bearing component. After that, the closure element with the first bearing component for forming a slide bearing for the inner joint portion are pressed into the housing cavity. For that purpose, the closure element is first formed from the first component and the second component. Owing to the pressing-in of the closure element, in its end position the closure element is pushed onto the second bearing component. In that way the second bearing component is fixed in place. Thereafter, an edge of the joint housing is deformed in order to fix the closure element. Thus, the closure element is sufficiently well secured against being pulled out of the joint cavity.

In particular, the ball joint and/or closure element made in accordance with the method according to the invention is a ball joint and/or closure element according to the invention as described earlier. Preferably, the method is developed further in accordance with the design features explained in connection with the ball joint and/or closure element according to the invention described here. Furthermore, the bail joint and/or closure element described here can be developed further in accordance with the features explained in connection with the method.

BRIEF DESCRIPTION OF THE DRAWINGS

Below, the invention is explained in greater detail with reference to the figures, in which the same indexes are given to the same, similar or functionally equivalent components or elements. The figures show.

DETAILED DESCRIPTION

Figure 1:
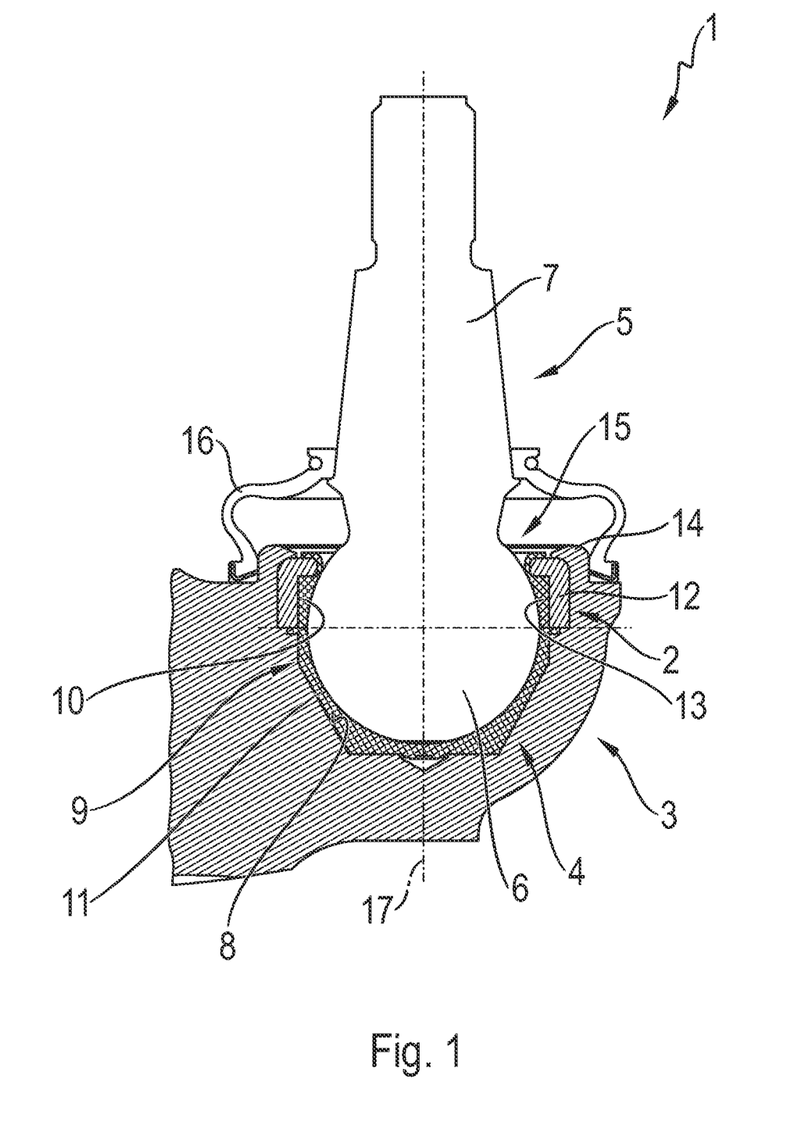
FIG. 1: A sectioned side view of a first ball joint according to the invention with a first closure element according to the invention.

FIG. 1 shows a sectioned side view of a first ball joint 1 according to the invention with a first closure element 2, according to the invention. In this example embodiment, the ball joint 1 is in the form of a ball stud joint. In addition, in this case the closure element 2 is in the form of a closure ring. The ball joint 1 has a joint housing 3. The joint housing 3 can, for example, be made as part of a chassis component. The joint housing 3 has a housing cavity 4. In this example embodiment, the housing cavity 4 is essentially pot-like or cup-shaped. Furthermore, the ball joint 1 has an inner joint portion 5. The inner joint portion 5 is in this case in the form of a ball stud. Correspondingly, the inner joint portion 5 comprises a joint ball 6 and a stud portion 7. The inner joint portion 5 or joint ball 6 is fitted into and able to move in the housing cavity 4. In this case, a two-part slide bearing 9 is arranged between an inside 8 of the housing cavity 4 and the inner joint portion 5. The two-part slide bearing 9 is formed by a first bearing component 10 and a second bearing component 11. The first bearing component 10 is part of the closure element 2. The closure element 2 itself is formed of a first component 12 and a second component 13. In this case the second component 13 at the same time forms the first bearing component 10. The first component 12 is made of metal and the second component 13 is made of a plastic material.

The joint housing 3 has a rim 14. The rim 14 is deformed in such manner that the closure element 2 is secured against being pulled out of the housing cavity 4. The stud portion 7 extends outward out of the housing cavity 4 through an opening 15 of the closure element 2. Furthermore, the ball joint 1 has a sealing bellows 16. In this case the sealing bellows 16 is in contact on the one hand with the joint housing 3 and on the other hand with the stud portion 7.

As shown by this representation, the closure element 2 and the ball joint 1 are made rotationally symmetrically relative to a central longitudinal axis 17. Here, the inner joint portion 5 is fitted into the slide hearing 9 so that it can move relative to the central longitudinal axis 17 and/or to a mid-point of the joint ball 6.

Figure 2:
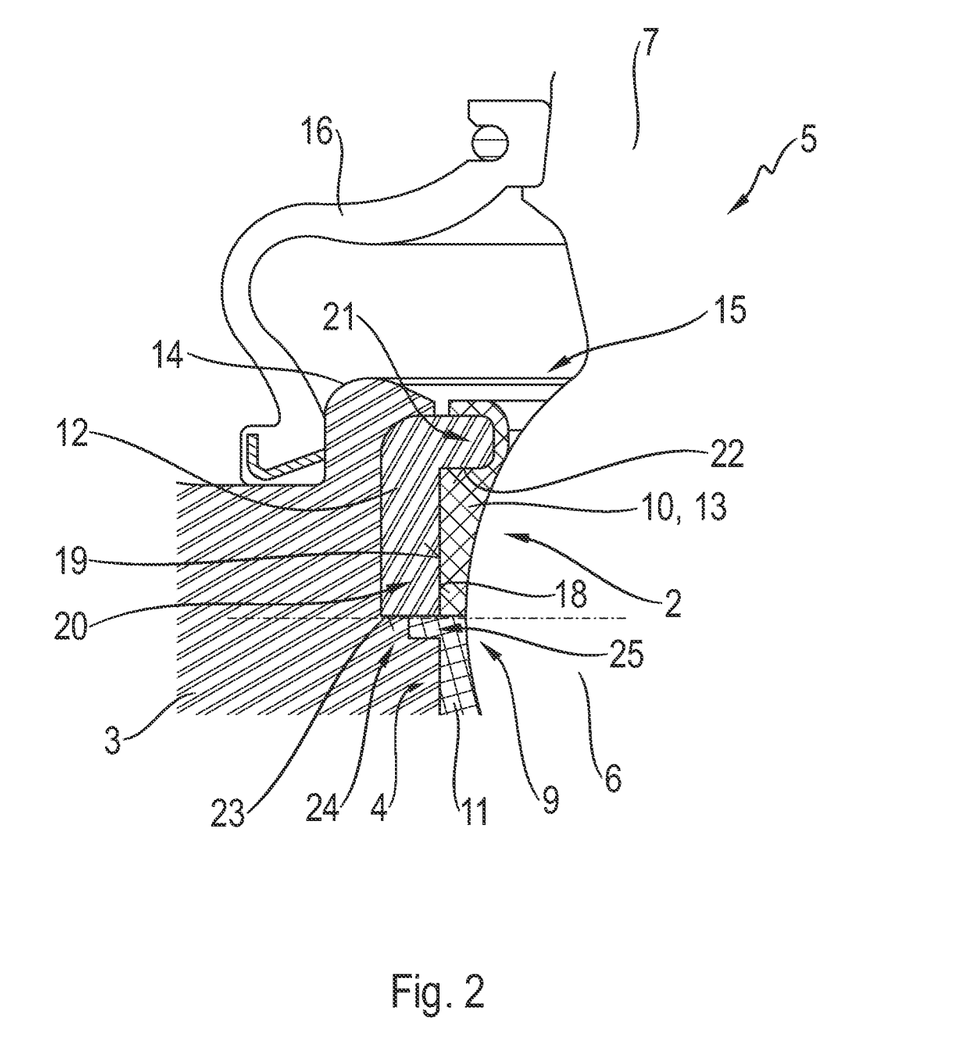
FIG. 2: Part of the sectioned side view according to FIG. 1, FIG. 3: A sectioned side view of a second bail joint according to the invention with a second closure element according to the invention.

FIG. 2 shows part of the sectioned side view according to FIG. 1. The first component 12 has a cylindrical inside circumferential surface 18. A cylindrical outer circumferential surface 19 of the second component 13 is in contact with the inside circumferential surface 18. In this case the inside circumferential surface 18 of the first component 12 is formed by a hollow-cylindrical web section 20 of the first component 12. In this example embodiment, the second component 13 or the first bearing component 10 is injection-molded onto the first component 12 and the outer circumferential surface 19.

In this example embodiment, in addition to the web section 20, the first component 12 has a ring section 21. Starting from the web section 20 the ring section 21 extends radially inward relative to the central longitudinal axis 17, according to FIG. 1. In this case, the second component 13 or first bearing component 10 is arranged on a surface 22 of the ring section 21 that faces toward the web section 20. Moreover, in this example embodiment the ring section 21 is covered by the second component 13 or the first bearing component 10. In other words, the ring section 21 is embedded in the second component 13 or in the first bearing component 10. In this example embodiment, in the assembled condition shown here the first component 12 has an L-shaped cross-section standing on its end or rotated through 180°.

In this example embodiment, an end face 23 of the first component 12 facing away from the ring section is pressed in the axial direction relative to the central longitudinal axis, both against a projection 24 of the housing cavity 4 and against a rim flange 25 of the second bearing component 11 held with interlock in the housing cavity 4. In that way the second bearing component 11 is fixed in place inside the housing cavity 4.

In this example embodiment, the contact surface of the closure element 2 is located, with the second bearing component 11, in an equatorial plane of the joint ball 6 (concerning this see also FIG. 1).

Figure 3:
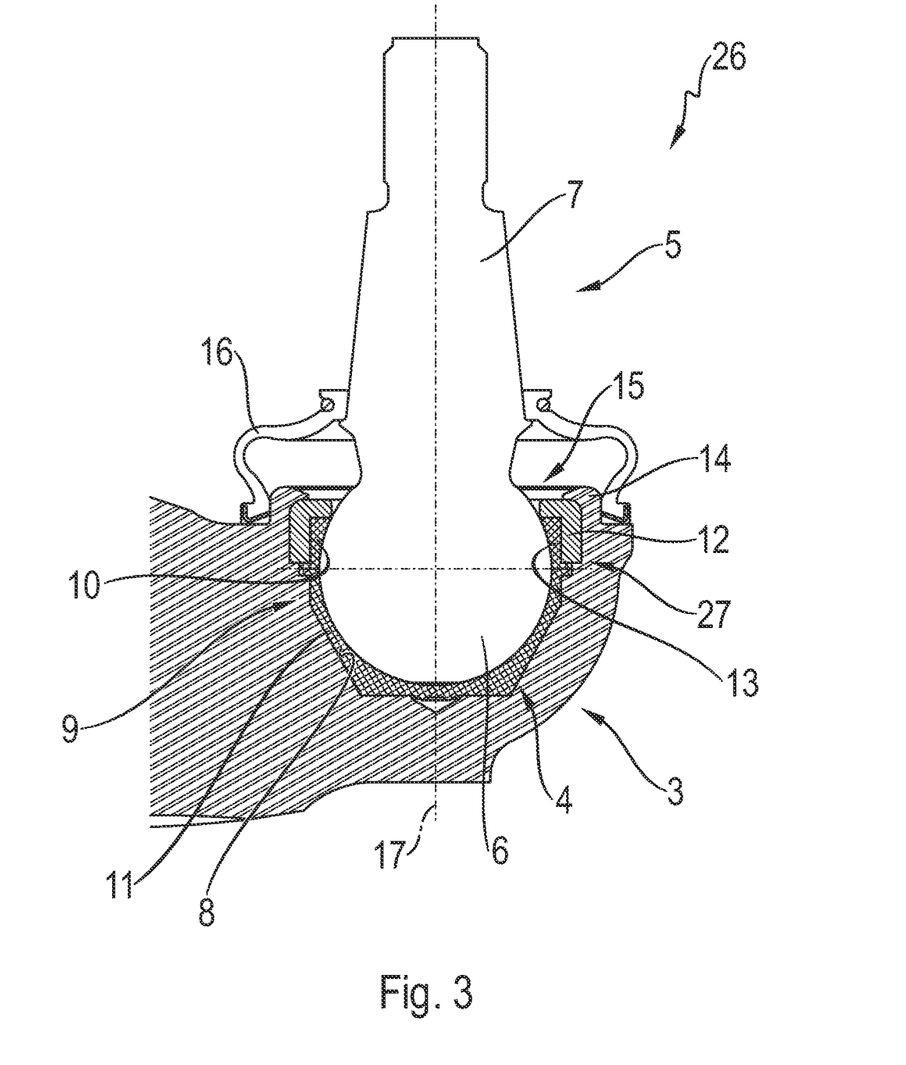

FIG. 3 shows a sectioned side view of a second ball joint 26 with a second closure element 27, according to the invention. The same features are given the same indexes as before. Accordingly, to avoid repetitions reference should also be made to the previous description. The structure and function of the ball joint 26 and closure element 27 shown here are largely the same as those of the ball joint 1 and the closure element 2 according to FIGS. 1 and 2, The comparative differences will be described in greater detail with reference to the next figure.

Figure 4:
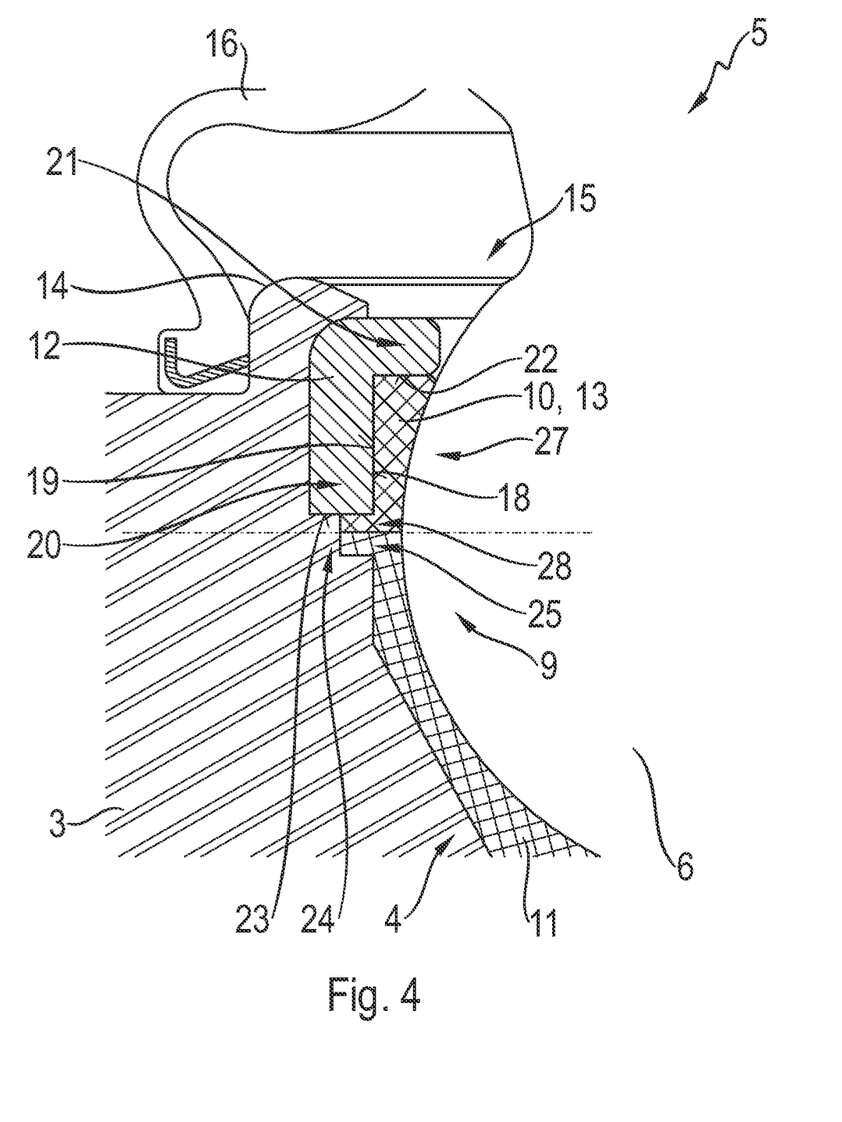
FIG. 4: Part of the sectioned side view according to FIG. 3, FIG. 5: A sectioned side view of a third ball joint according to the invention with a third closure element according to the invention.

FIG. 4 shows part of the sectioned side view according to FIG. 3. Otherwise than in the design according to FIGS. 1 and 2, in the closure element 27 shown in this case the ring section 21 is not completely embedded in the second component 13 or first bearing component 10. Instead, in this example embodiment the second component 13 or the first bearing component 10 contact only the surface 22 of the ring section 21.

Furthermore, in this example embodiment the second component 13 or the first bearing component 10 partially cover the end face 23 of the first component 12. In that way a rim section 28 of the second component 13 or the first bearing component 10 is formed, which faces toward the second bearing component 11. In this example embodiment, the said rim section 28 is essentially formed mirror-symmetrically to the rim flange 25 of the second bearing component 11. Furthermore, in this example embodiment the rim section 28 and the rim section 25 are located one above the other in an equatorial plane of the joint ball 6.

Figure 5:
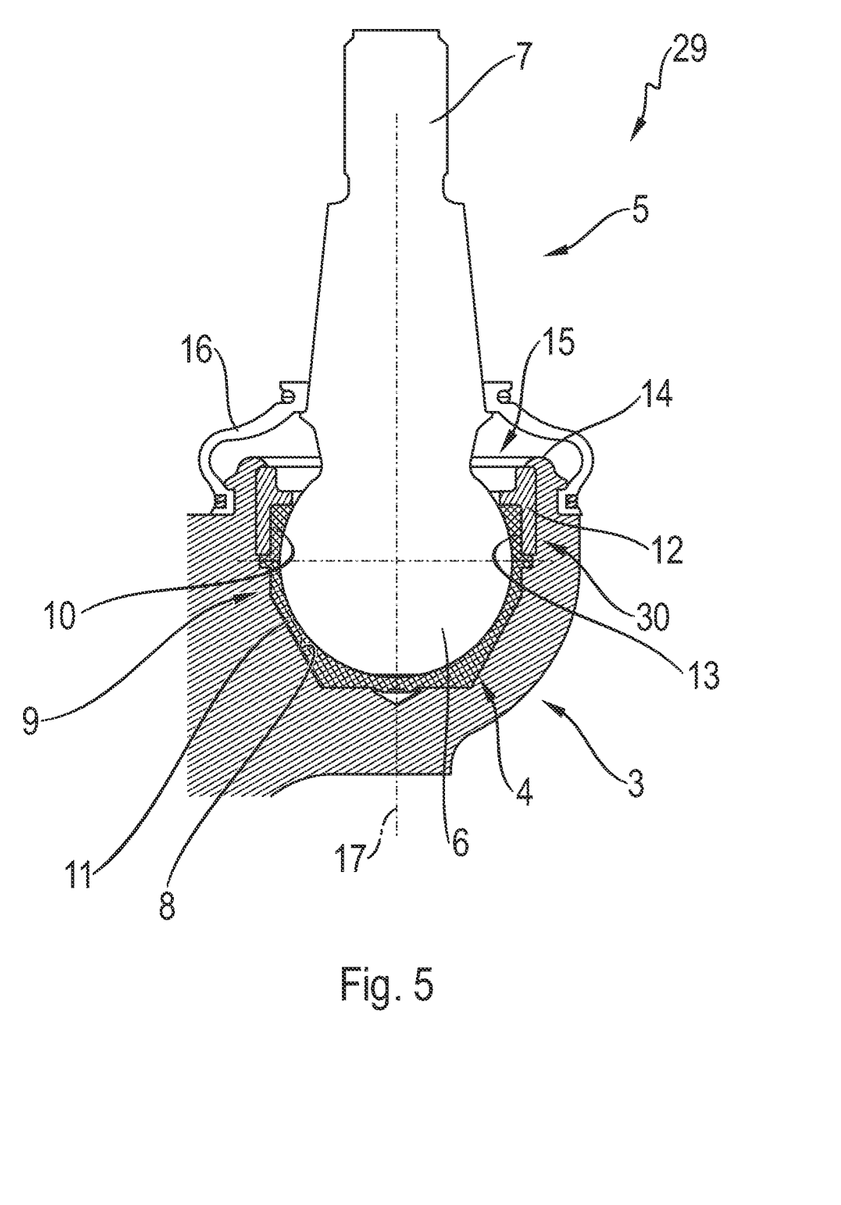

FIG. 5 shows a sectioned side view of a third ball joint 29 according to the invention, with a third closure element 30 according to the invention. The same features are given the same indexes as before. Accordingly, to avoid repetitions reference should also be made to the previous description. The functioning and structure of the ball joint 29 and the closure element 30 correspond in large measure to those of the ball joint 26 and the closure element 27 shown in FIGS. 3 and 4. The comparative differences will be described in greater detail with reference to the next figure.

Figure 6:
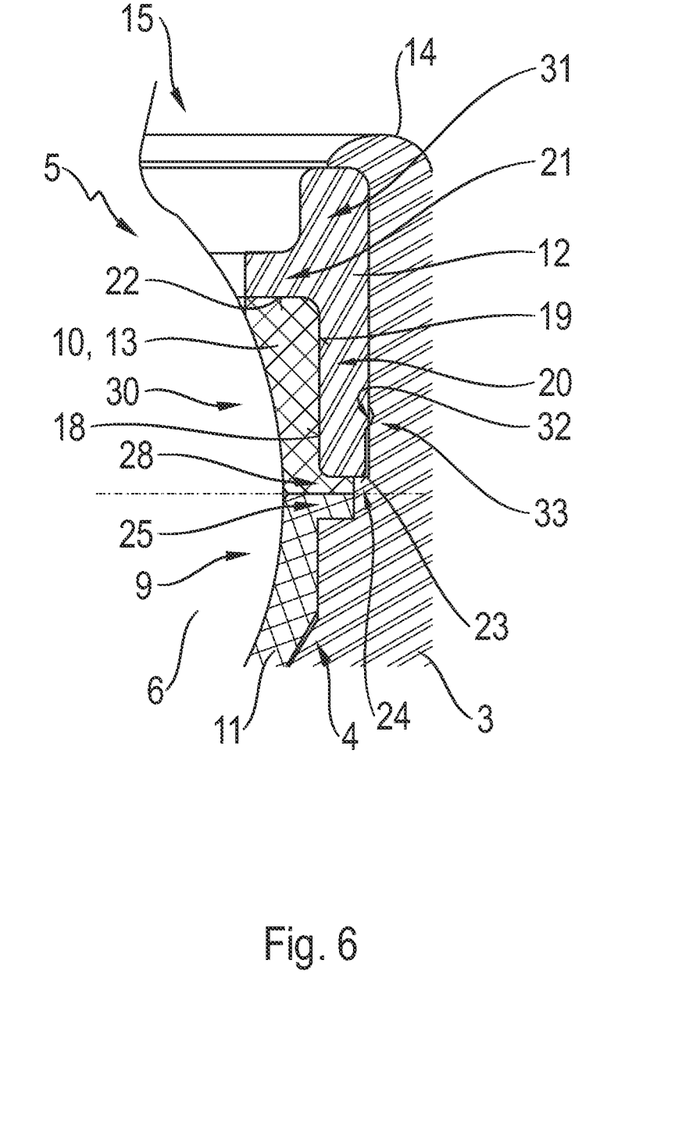
FIG. 6: Part of the sectioned side view according to FIG. 5, FIG. 7: A sectioned side view of a further ball joint according to the invention with a further closure element according to the invention.

FIG. 6 shows part of the sectioned side view according to FIG. 5. With the closure element 30 shown here, the second component 13 and first bearing component 10 are made exactly as in the closure element 27 according to the earlier FIGS. 3 and 4. Thus, the second component 13 and the first bearing component 10 are in contact with the surface 22, the inner circumferential surface 18 and partially the end face 23 of the first component 12.

Otherwise than in the closure element 27 according to FIGS. 3 and 4, the closure element 30 and the first component 12 in this example embodiment comprises an additional web-like flange section 31. Starting from the ring section 21, the flange section 31 extends coaxially relative to the central longitudinal axis 17 shown in FIG. 5 in a direction facing away from the web section 20 and the second component 13. Here, the flange section 31 is essentially of hollow-cylindrical shape. Furthermore, in this example embodiment the flange section is essentially a prolongation of the web section 20. In this example embodiment the first component 12 in the assembled condition illustrated here has a T-shaped cross-section rotated through 90°.

Furthermore, the outer circumference of the first component 12 has a projection 32. In this example embodiment a plurality of projections 32 are arranged distributed uniformly in the circumferential direction around the outer circumference of the first component 12. In this case the projection is, for example, in the form of a claw tab. In the assembled condition shown here the projection 32 engages in a correspondingly shaped recess 33 on the inside of the housing cavity 4. By virtue of the interlocking co-operation of the projection 32 with the recess 33, the closure element 30 is additionally secured against being pulled out of the housing cavity 4.

All the other closure elements described in the context of the present application can also have one or more projections.

Figure 7:
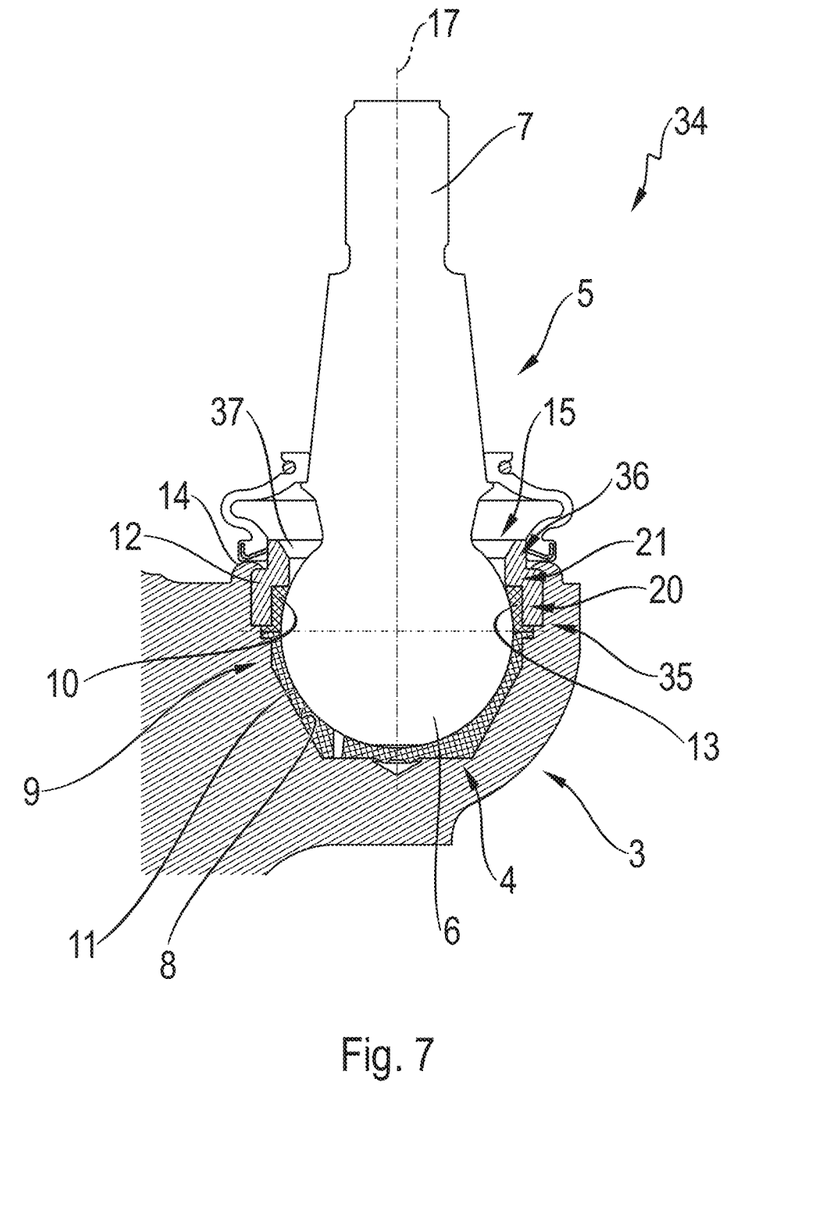

FIG. 7 shows a sectioned side view of a further ball joint 34 according to the invention, with a further closure element 35 according to the invention. The same features are given the same indexes as before. Accordingly, to avoid repetitions reference should also be made to the earlier description. The ball joint 34 and the closure element 35 correspond in large measure to the ball joint 29 and the closure element 30 according to FIGS. 5 and 6.

The difference is that instead of the flanges 31, the first component 12 has a flange section 36 which is displaced radially inward in relation to the central longitudinal axis 17. This produces a stepped cross-section for the first component 12 of the closure element 35. In this case the flange section 36 extends, starting from the radially inner end of the rim section 21, in the axial direction relative to the central longitudinal axis 17 in a direction away from the second component 13 or first bearing component 10. In this example embodiment the flange section 36 has on its inside an oblique contact surface 37 opening in a flannel shape toward the outside. This contact surface 37 can serve as a stop for the inner joint portion 5.

Figure 8:
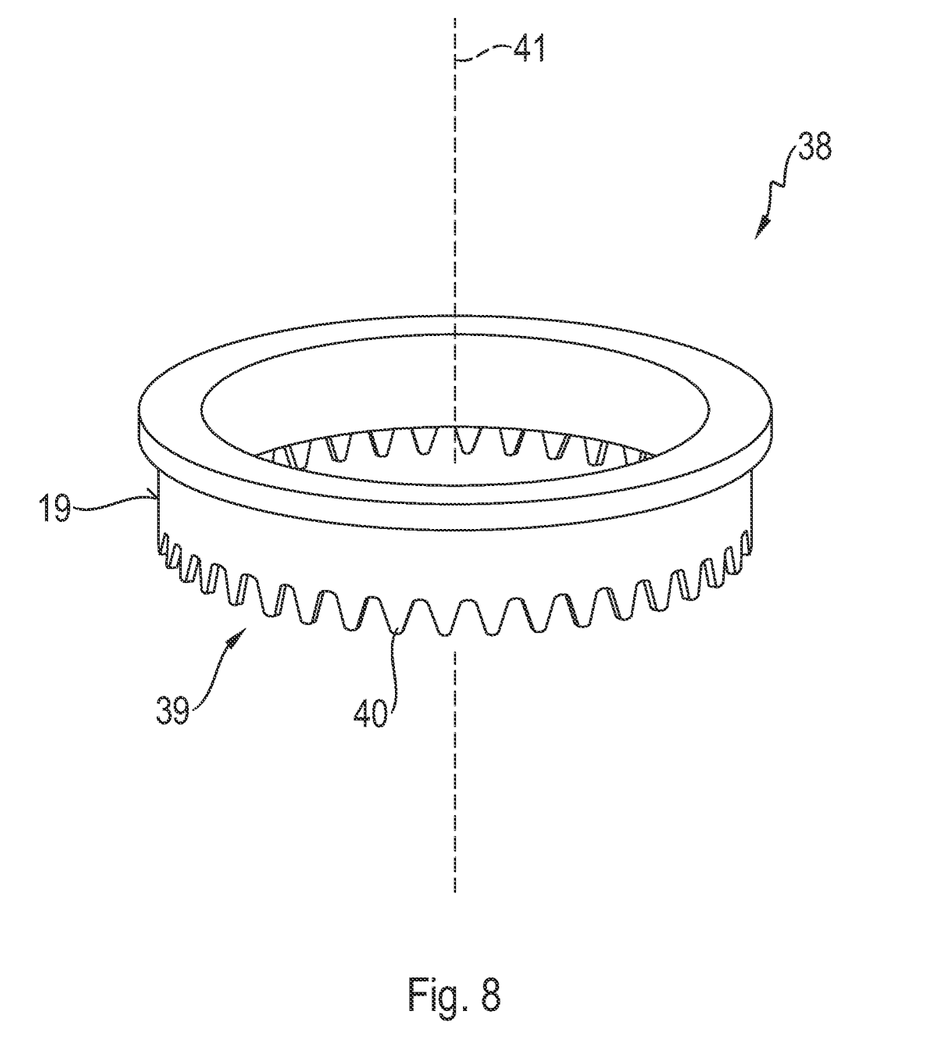
FIG. 8: A perspective side view of a first bearing component for producing a two-part slide bearing.

FIG. 8 shows a perspective side view of a first bearing component 38 for forming a two-part slide bearing. The first bearing component 38 is of annular or ring-like form. The first bearing component 38 has an outer circumferential surface 19. This outer circumferential surface 19 can be in direct contact with an inner circumferential surface 18 of a first component 12, in the manner of the previous figures, to form a closure element (no more of which is illustrated here). A rim 39 has a plurality of first interlocking elements 40. In this example embodiment the said interlocking elements 40 are in the form of teeth. In this case the first interlocking elements 40 extend in the axial direction relative to a longitudinal axis 41 of the first bearing component 38, away from the first bearing component 38 to form the rim 39. Thus, by virtue of the interlocking elements 40 an annular tooth array is produced.

Figure 9:
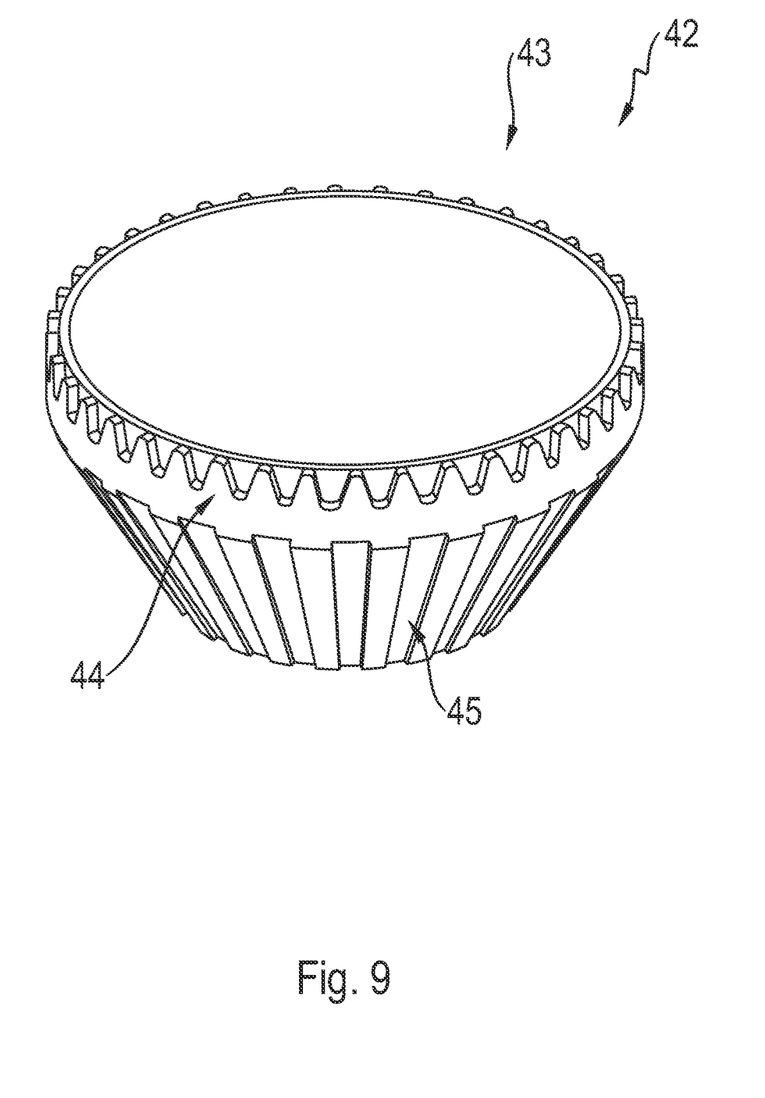
FIG. 9: A perspective side view of a second bearing component for producing the two-part slide bearing in combination with the first bearing component shown in FIG. 8, FIG. 10: A perspective side view of a further first bearing component for producing a two-part slide bearing.

FIG. 9 shows a perspective side view of a second bearing component 42 for forming the two-part slide bearing in combination with the first bearing component 38 shown in FIG. 8. The second bearing component 42 is pot-shaped or cup-shaped. A rim 43 of the second bearing component 42 has at its outer circumference second interlocking elements 44. The said second interlocking elements 44 are in the form of recesses in the outer circumference of the rim 43. shaped to correspond with the first interlocking elements 40 of the first bearing component 38 shown in FIG. 8. When the first bearing component 38 and the second bearing component 42 are fitted together, the first interlocking elements 40 move past the outer circumference of the rim 43 and into the second interlocking elements 44.

Furthermore, in this example embodiment the second bearing component 42 has corrugations 45. The corrugations 45 are formed on the outside of the second bearing component 42. When a two-part slide bearing has been assembled in order to -form a ball joint (not shown here) the corrugations 45, when tempered, reduce or compensate undesired stresses, in particular stresses which act axially.

The first bearing components 10 and second bearing components 11 shown in FIGS. 1 to 7 can have a rim 39 or a rim 43 and/or corrugations 45, as shown here.

Figure 10:
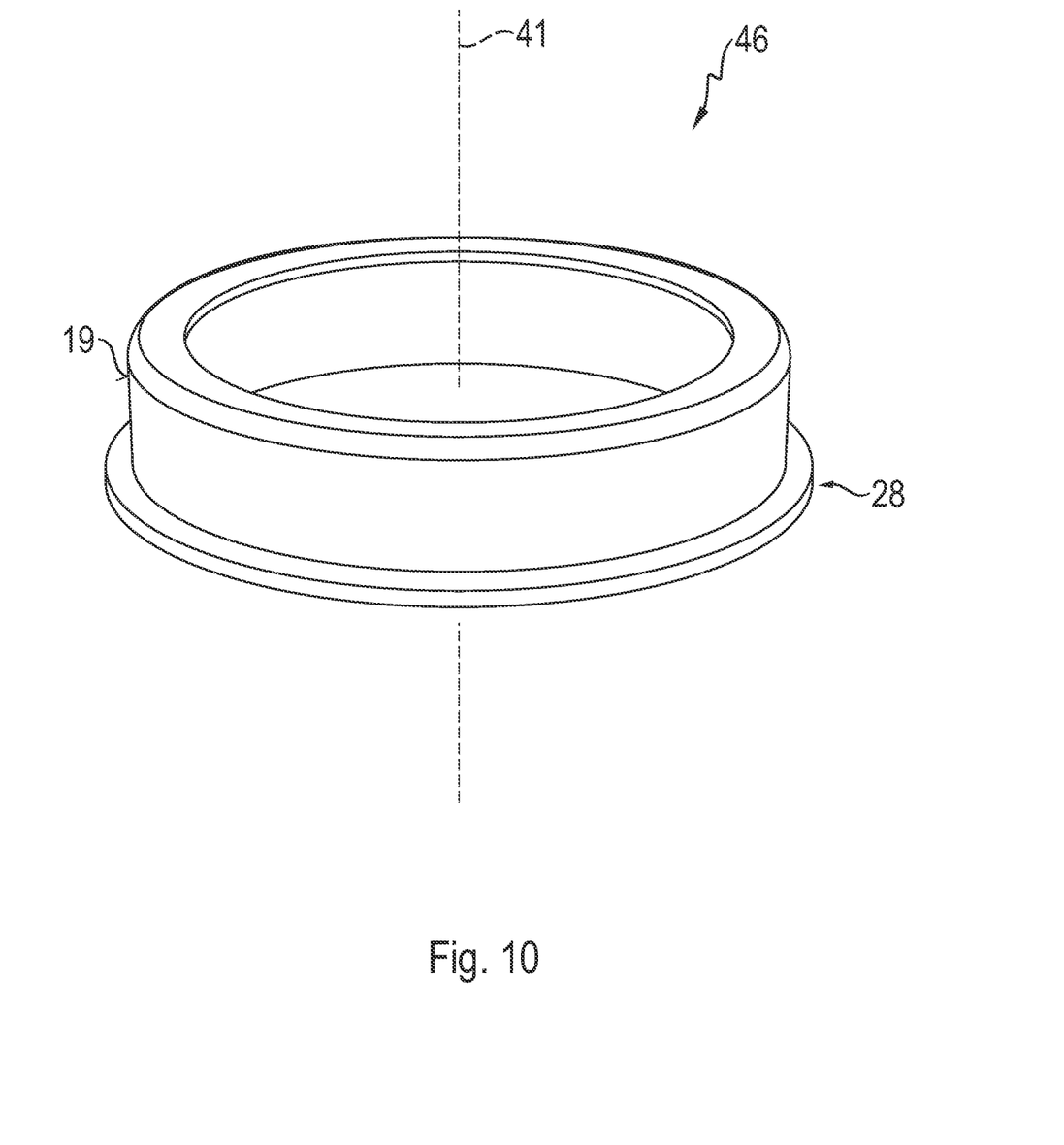

FIG. 10 shows a perspective side view of a further first bearing component 46 for forming a two-part slide bearing. Instead of the rim 39, the first bearing component 46 has a rim section 28 as shown, for example, in FIGS. 4 and 6. Accordingly, reference should also be made to the earlier description.

Figure 11:
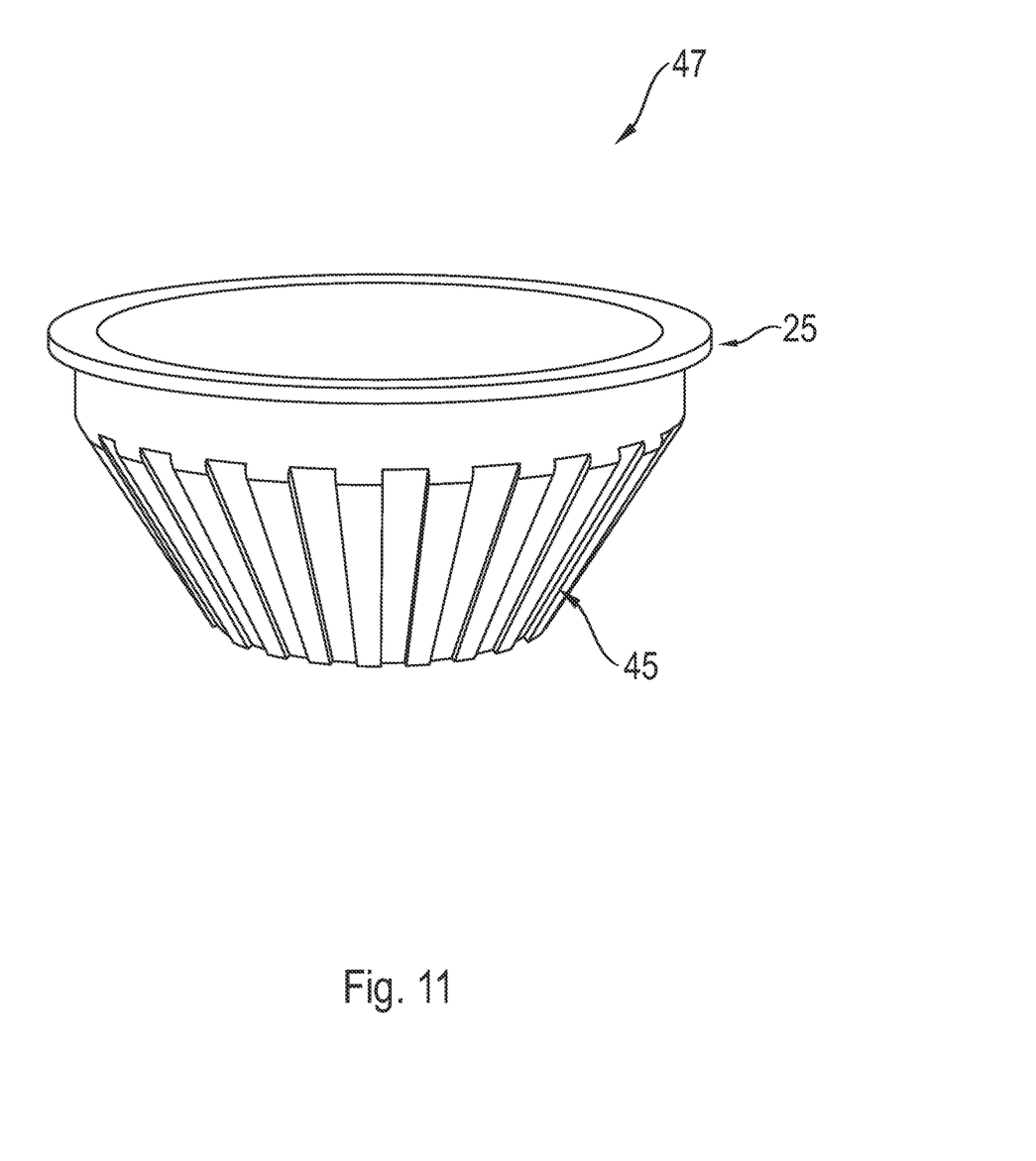
FIG. 11: A perspective side view of a further second bearing component for producing the two-part slide bearing in combination with the further first bearing component shown in FIG. 10.

FIG. 11 shows a perspective side view of a further second bearing component 47 for forming the two-part slide bearing in combination with the further first bearing component 46 according to FIG. 10. Instead of the rim 43 as in the second bearing component 42 in FIG. 9, this second bearing component 47 has a rim flange 25 as shown in FIGS. 4 and 6. Accordingly, reference should also be made to the earlier description.

INDEXES

1 Ball joint
2 Closure element
3 Joint housing
4 Housing cavity
5 Inner joint portion
6 Joint ball
7 Stud portion
8 Inner side
9 Slide bearing
10 First bearing component
11 Second bearing component
12 First component
13 Second component
14 Rim
15 Opening
16 Sealing bellows
17 Central longitudinal axis
18 Inner circumferential surface
19 Outer circumferential surface
20 Web section
21 Ring section
22 Surface
23 End face
24 Projection
25 Rim flange
26 Ball joint
27 Closure element
28 Rim section
29 Ball joint
30 Closure element
31 Flange section
32 Projection
33 Recess
34 Ball joint
35 Closure element
36 Flange section
37 Contact surface
38 First bearing component
39 Rim
40 First interlocking element
41 Longitudinal axis
42 Second bearing component
43 Rim
44 Second interlocking element
45 Corrugations
46 First bearing component
47 Second bearing component

The invention claimed is:

1. A closure element for a ball joint, defining a central longitudinal axis, the closure element comprising:

a first component made of metal and having a hollow-cylindrical web section that extends axially, and the web section has a cylindrical inner circumferential surface; and a first bearing component made of a plastic material, the first bearing component being part of a two-part slide bearing, wherein the first bearing component has a cylindrical outer circumferential surface arranged on the inner circumferential surface of the first component in an interlocked, frictionally fixed, and/or material-bonded manner;

wherein the web section of the first component has an axial front end face that extends radially outward from the inner circumferential surface thereof, and the first bearing component has at least one flange that extends radially outward from the outer circumferential surface thereof; and at least a portion of the front end face of the web section abuts the at least one flange of the first bearing component.

2. The closure element according to claim 1, wherein the first bearing component is injection-molded and/or cast onto the first component.

3. The closure element according to claim 2, wherein at least one ring section of the first component extends, starting from an axial end of the inner circumferential surface opposite the front end face of the web section, radially inward and perpendicularly to the central longitudinal axis of the closure element, and wherein the first bearing component is arranged in an interlocked, frictionally fixed and/or material-bonded manner on a surface of the at least one ring section that faces toward the web section.

4. The closure element according to claim 3, wherein the at least one ring section is covered by the first bearing component and/or the at least one ring section is embedded in the first bearing component, and/or the front end face of the web section of the first component that faces away from the at least one ring section is at least partially covered by the at least one flange of the first bearing component and/or embedded in the first bearing component.

5. The closure element according to claim 3, wherein the first component comprises a web-like flange section that extends, starting from the at least one ring section, coaxially relative to the central longitudinal axis of the closure element, in a direction away from the web section and/or from the first bearing component, and wherein the first component has an L-shaped, T-shaped, or stepped cross section.

6. The closure element according to claim 1, wherein an outer circumference of the first component faces away from the first bearing component.

7. The closure element according to claim 6, wherein the outer circumference has at least one projection in a form of a claw tab.

8. A ball joint for a chassis of a vehicle, comprising:
a joint housing defining a housing cavity and a central longitudinal axis of the ball joint;
an inner joint portion comprising a joint ball is fitted and able to move in the housing cavity of the joint housing;
a two-part slide bearing is arranged between an inside of the housing cavity and the inner joint portion; and
a closure element comprising:
a first component made of metal and having a hollow-cylindrical web section that extends axially, and the web section has a cylindrical inner circumferential surface; and
a first bearing component made of a plastic material, the first bearing component being part of the two-part slide bearing, wherein the first bearing component has a cylindrical outer circumferential surface arranged on the inner circumferential surface of the first component in an interlocked, frictionally fixed, and/or material-bonded manner;
wherein the web section of the first component has an axial front end face that extends radially outward from the inner circumferential surface thereof, and the two-part slide bearing has at least one flange that extends radially outward from the outer circumferential surface thereof; and
at least a portion of the front end face of the web section abuts the at least one flange of the two-part slide bearing.

9. The ball joint according to claim 8, wherein the two-part slide bearing has a second bearing component, wherein the first being component and the second bearing component of the two-part slide bearing are arranged and/or made rotationally symmetrically relative to the central longitudinal axis of the ball joint.

10. The ball joint according to claim 9, wherein the first bearing component is pressed in an axial direction of the central longitudinal axis by means of the first component onto the second bearing component, and wherein the second bearing component of the two-part slide bearing is cup-shaped.

11. The ball joint according to claim 8, wherein an outer circumference of the first component of the closure element is in contact with the inside of the housing cavity and/or the closure element is pressed into the housing cavity, and a rim of the joint housing is deformed to fix the closure element in place.

12. A method for producing a closure element for a ball joint, the closure element defining a central longitudinal axis and has a first component made of metal and having a hollow-cylindrical web section that extends axially, and the web section has a cylindrical inner circumferential surface, and a first bearing component made of a plastic material and having a cylindrical outer circumferential surface arranged on the inner circumferential surface of the first component in an interlocked, frictionally fixed, and/or material-bonded manner, the web section of the first component has an axial front end face that extends radially outward from the inner circumferential surface thereof, the first bearing component has a flange that extends radially outward from the outer circumferential surface, the method comprising:
at least one of arranging, pressing, and/or injection-molding the first bearing component onto the first component; and
uniting the first component with the first bearing component such that at least a portion of the front end face of the web section of the first component abuts the flange of the first bearing component.

13. The method according to claim 12, further comprising:
inserting a second bearing component into a housing cavity of a joint housing;
arranging an inner joint portion, comprising a joint ball, in the second bearing component;
pressing the closure element with the first bearing component into the housing cavity to form a two-part slide bearing for the inner joint portion, so that the closure element is pressed against the second bearing component; and
deforming a rim of the joint housing in order to fix the closure element in place.

* * * * *